(12) United States Patent
Adibhatla et al.

(10) Patent No.: US 6,282,884 B1
(45) Date of Patent: Sep. 4, 2001

(54) MODE BLENDING AND TUNING SYSTEM FOR TURBINE ENGINES

(75) Inventors: Sridhar Adibhatla, West Chester; Matthew W. Wiseman, Fairfield; Georges A. Becus, West Chester, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/309,013

(22) Filed: May 10, 1999

(51) Int. Cl.$^7$ .................................................. F02G 9/00
(52) U.S. Cl. ............................................. 60/39.281
(58) Field of Search ............................ 60/233, 235, 240, 60/243, 242, 226.1

(56) References Cited

U.S. PATENT DOCUMENTS 4,258,545 * 3/1981 Slater ...................................... 60/226

OTHER PUBLICATIONS

Paper entitled "Intelligent Mode Selection and Blending for Engine Control," by M. Wiseman, G. Becus and S. Adibhatla, presented to the 34th AIAA/ASME/SAE/ASEE Joint Propulsion Conference & Exhibit Jul. 13–15, 1998, Cleveland, Ohio.

* cited by examiner

Primary Examiner—Timothy S. Thorpe
Assistant Examiner—William H Rodriguez
(74) Attorney, Agent, or Firm—Andrew C. Hess; Nathan D. Herkamp

(57) ABSTRACT

A control unit in accordance with an exemplary embodiment of the present invention includes a multiplicity of regulators ($K_i$) and generates an output corresponding to blended and tuned actuator values. More particularly, and in the exemplary embodiment, the control unit includes a plurality of regulators ($K_i$), and each regulator ($K_i$) corresponds to a mode of operation or operating conditions. Each regulator ($K_i$) is configured to receive engine parameters as input and to generate output values for at least one actuator command $u_j$. Respective gain schedulers are coupled to each regulator ($K_i$), and each scheduler receives, as input, an operating point which corresponds to at least one of a power setting parameter and an inlet temperature or pressure. Based on the operating point, each scheduler selects a gain to supply to its respective regulator ($K_i$). The control unit further includes a mode selector which receives as its input at least one of control inputs, control errors, and control error rates, and generates as its outputs a plurality of blending gain values $A_i$ and tuning gain values $B_j$. The blending outputs $A_i$ are supplied to respective multiplication units which multiply the respective gains $A_i$ by the respective regulator outputs. Outputs from the multiplication units are supplied to separate summation units which combine the respective gain-adjusted outputs for each parameter. The tuning outputs $B_j$ are supplied to multiplication units which multiply the respective gains $B_j$ by the outputs of the respective summation units.

20 Claims, 2 Drawing Sheets

MODE BLENDING AND TUNING SYSTEM FOR TURBINE ENGINES

GOVERNMENT RIGHTS

The United States Government has rights in this invention pursuant to Contract No. F33615-94-C-2428 awarded by the Department of the Air Force.

BACKGROUND OF THE INVENTION

This invention relates generally to turbine engines and more particularly, to controlling engine operation.

Known engine control units are configured to operate in multiple control modes for maintaining engine control under many different conditions. The control unit selects a mode of operation based on environmental and operating conditions, and the control unit supplies a fuel flow rate to an engine control processor. The engine control processor then utilizes the fuel flow rate supplied by the control unit to control engine operation.

Known control modes include, for example, a baseline mode, a combustor inlet pressure limiter mode, a fuel acceleration mode, and a fuel deceleration mode. The control unit output for each control mode is fuel flow. The baseline mode corresponds to normal operation of the aircraft engine. The combustor inlet pressure limiter mode is selected when combustor pressures approach maximum permissible limits. The fuel acceleration mode is selected during throttle burst transients to prevent compressor stall and turbine over-temperature. The fuel deceleration mode is selected during throttle chop transients to prevent combustor blowouts. Of course, many other modes are utilized to protect an engine from exceeding operability, mechanical integrity, and other limits, and to provide consistent engine responses.

For each control mode, and to ensure adequate engine control, many factors such as power level, rotor speeds, stall margins, temperatures, and demanded values of thrust are utilized in determining the control unit output. A typical control unit includes numerous single-input, single-output controllers, and each single-input, single-output controller is utilized to generate a value for one commanded actuator position. Specifically, each single-input single-output controller receives a single engine parameter as an input and outputs a value related to fuel flow rate.

The outputs from the controllers are selected based upon the current operation mode of the control unit. Particularly, the control unit output is generated by selecting the outputs from one of the controllers. For example, the controller outputs are selected when meeting a first set of conditions when the control unit is in the baseline mode, and the controller outputs are selected when meeting a second set of conditions when the control unit is in the fuel acceleration mode.

The known control unit described above utilizes simple controllers and selects from among controller outputs to generate the fuel flow rate. It would be desirable to modify the mode selector to improve engine performance. It also would be desirable to be able to set the appropriate control output when using several multivariable controllers.

BRIEF SUMMARY OF THE INVENTION

A control unit in accordance with an exemplary embodiment of the present invention includes multivariable model-based regulators and generates an output corresponding to actuator values rather than actuator rates. More particularly, and in the exemplary embodiment, the control unit supplies control values, i.e., actuator positions, for fuel flow (WF36), nozzle area (A8), and bypass area (A16) to an engine. The control unit includes regulators K1, K2, and K3 for a baseline low-power mode, a baseline high-power mode, and an operability mode, respectively. The baseline mode corresponds to normal operation of the aircraft engine, and each sub-mode within the baseline mode coincides with a range of power levels. The operability mode corresponds to engine operation when engine fan stall margin approaches a specified level.

Respective gain schedulers are coupled to each regulator K1, K2, and K3, and each scheduler receives, as input, an operating point which corresponds to a power setting parameter and fan inlet conditions. Based on the operating point, each scheduler selects a set of gains to supply to its respective regulator K1, K2, and K3.

Regulators K1, K2, and K3 are multiple input, multiple output type regulators, and each regulator K1, K2, and K3 receives, as input, values for errors in thrust ($E_{fn}$) and liner engine pressure ratio ($E_{lepr}$). Additionally, regulator K1 receives the error in engine pressure ratio ($E_{eprs}$), regulator K2 receives the error in engine temperature ratio ($E_{etr}$), and regulator K3 receives the error in fan stall margin ($E_{sm2}$). Based on these inputs and the gains selected by the schedulers, each regulator K1, K2, and K3 generates values for fuel flow (WF36), nozzle area (A8), and bypass area (A16).

The control unit further includes a mode selector which receives, as inputs, an engine control equivalent of throttle setting (PC), which varies from a value of 20 at ground idle to a value of 50 at military power, and stall margin (SMR), which is a ratio of stall margin (SM2) to a specified fan stall margin value (SM2DEM). The mode selector generates mode selection outputs $A_1$, $A_2$, and $A_3$. Outputs $A_1$, $A_2$, and $A_3$ are gains that have values in the interval [0,1], corresponding to the amount of contribution made by baseline low power regulator K1, baseline high power regulator K2, and operability regulator K3, respectively. The sum of outputs $A_1$, $A_2$, and $A_3$ is unity.

Specifically, outputs $A_1$, $A_2$, and $A_3$ are supplied to respective multiplication units which multiply the respective gains $A_1$, $A_2$, and $A_3$ by the respective regulator outputs. Outputs from the multiplication units are supplied to separate summation units which combine the respective gain-adjusted outputs for each parameter. That is, the gain-adjusted values for fuel flow (WF36) from each multiplier are added together at a first summation unit. Similarly, the gain-adjusted values for nozzle area (A8) are added together at a second summation unit, and the gain-adjusted values for bypass area (A16) are added together at a third summation unit. The summation unit outputs are supplied to the engine to control actuator positions.

In the exemplary embodiment, the mode selector transitions from the low power baseline mode to the high power baseline mode when the throttle setting (PC) is in the interval [37.5,42.5]. The selector transitions between the baseline mode and the stall margin mode as the stall margin limit is approached. The values for the respective gains output by the selector are determined in accordance with the following rules:

$A1=(1.0-A_3)\max(0.0,\min(1.0,(42.5-PC)0.2))$, $A2=(1.0-A_3)(1.0-A_1)$, and $A3=\max(0.0,\min(1.0,2.0(1.0-SMR)))$.

The mode selector utilizes fixed rules based on the engine parameters throttle setting (PC) and stall margin (SMR) to select a combination of individual modes for deriving values for fuel flow (WF36), nozzle area (A8), and bypass area (A16).

The above described control unit includes multivariable controllers rather than only single-input, single-output controllers. Such multivariable controllers enable robust control of the engine. In addition, the regulator outputs are actuator values rather than actuator rates, and model-computed parameters such as thrust (FN), engine temperature ratio (ETR), and stall margin (SM2) are used in addition to sensed parameters or simple ratios of sensed parameters. Also, a gradual transition between modes is possible by blending the outputs from each regulator. rather than selecting between controller outputs. Further, to function as the known control unit described above, one of gains $A_1$, $A_2$, and $A_3$ can be set to 1.0 at any given time with the other gains set at zero.

DETAILED DESCRIPTION OF THE INVENTION

Figure 1:
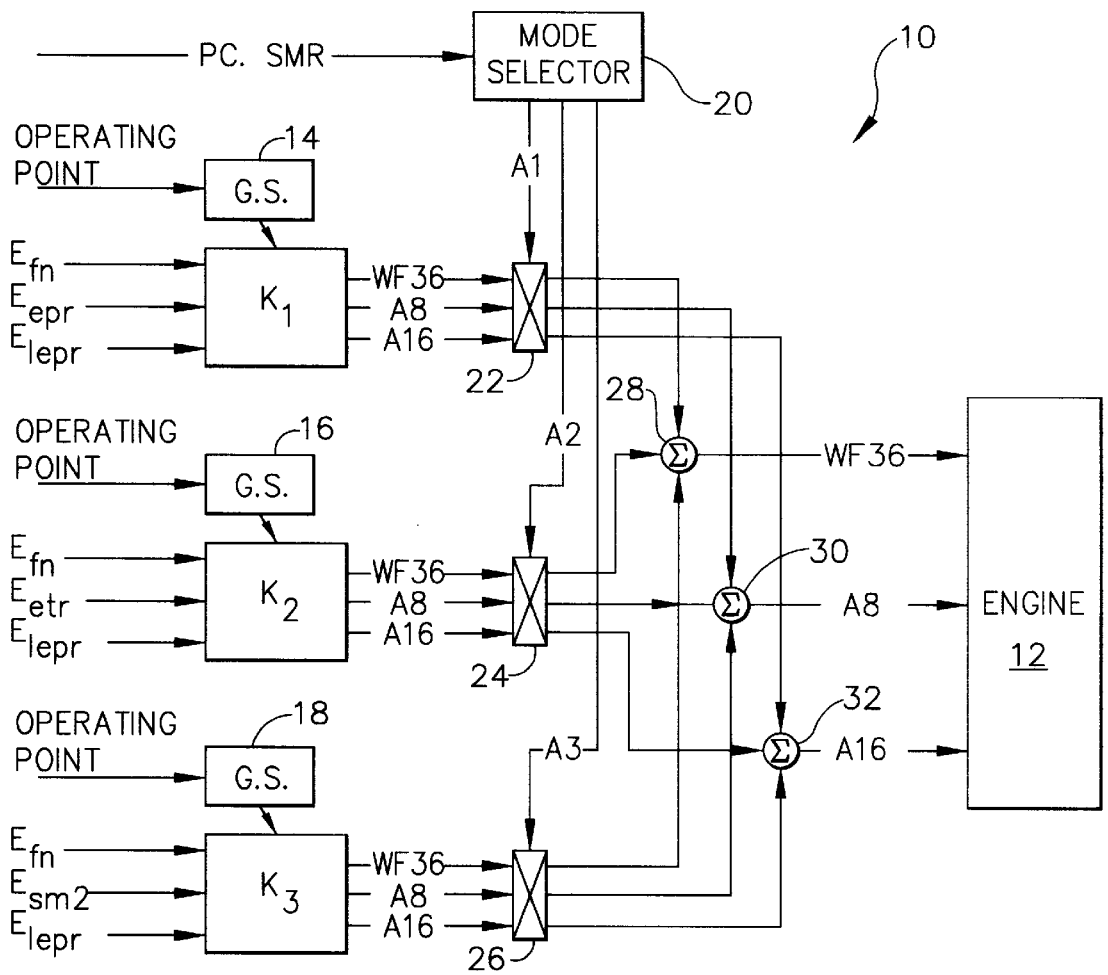
FIG. 1 is a block diagram of a control unit in accordance with one embodiment of the present invention.

FIG. 1 is a block diagram of a control unit 10 in accordance with one embodiment of the present invention. Control unit 10 could be implemented, for example, utilizing a high speed processor such as a Motorola 68040 processor. In addition, analog-to-digital converters convert the analog input signals to digital signals for processing.

Generally, control unit 10 supplies control values, i.e., actuator positions, for fuel flow (WF36), nozzle area (A8), and bypass area (A16) to engine 12. Unit includes regulators K1, K2, and K3, and each regulator K1, K2, and K3 corresponds to a different mode of operation or operating condition, and receives, as input, at least one value for an engine parameter. Each regulator K1, K2, and K3 generates an output value for at least one of fuel flow and nozzle area.

In the exemplary embodiment, regulator K1 corresponds to a baseline low-power mode, regulator K2 corresponds to a baseline high-power mode, and regulator K3 corresponds to an operability mode. The baseline mode corresponds to normal operation of the aircraft engine, and each sub-mode within the baseline mode coincides with a range of power levels. The operability mode corresponds to engine operation when engine fan stall margin approaches a specified minimum level.

Respective gain schedulers 14, 16, and 18 are coupled to each regulator K1, K2, and K3. Each scheduler 14, 16, and 18 receives, as input, an operating point which corresponds to at least one of a power setting parameter and an inlet temperature or pressure, e.g., fan inlet conditions. Based on the operating point. each scheduler 14, 16, and 18 computes a set of gains to supply to its respective regulator K1, K2, and K3. Gain schedulers 14, 16, and 18 modify the controller gains as a function of the engine operating condition.

Regulators K1, K2, and K3 are multiple input, multiple output type regulators. Each regulator K1, K2, and K3 receives, as input, at least one of an error in a sensed value for fan speed, an error in sensed value for combustor pressure an error in sensed value for turbine temperature, a value determined from sensed values, and a model-computed parameter. In the exemplary embodiment, each regulator K1, K2, and K3 receives, as input, values for errors in thrust ($E_{fn}$) and liner engine pressure ratio ($E_{lepr}$). Additionally, regulator K1 receives the error in engine pressure ratio ($E_{eprs}$), regulator K2 receives the error in engine temperature ratio ($E_{etr}$), and regulator K3 receives the error in fan stall margin ($E_{sm2}$). Based on these inputs and the gains selected by schedulers 14, 16, and 18, each regulator K1, K2, and K3 generates values for fuel flow (WF36), nozzle area (A8), and bypass area (A16).

Schedulers 14, 16, and 18 and regulators K1, K2, and K3 can be implemented using well known configurations. For example, in one embodiment, schedulers 14, 16, and 18 are be table-lookup based to determine gains, and regulators K1, K2, and K3 are proportional plus integral (PI) regulators. In alternative embodiments, schedulers 14. 16, and 18 utilize curve-fits to determine gains, and regulators K1. K2, and K3 are H-infinity regulators, which are well known.

Control unit 10 farther includes a mode selector 20. Mode selector 20 receives, as inputs, an engine control equivalent of throttle setting (PC), which varies from a value of 20 at ground idle to a value of 50 at military power, and stall margin (SMR), which is a ratio of stall margin (SM2) to a specified fan stall margin value (SM2DEM). Mode selector 20 generates mode selection gain outputs $A_1$, $A_2$, and $A_3$ Gains $A_1$, $A_2$, and $A_3$ are gains that have values in the interval [0,1], corresponding to the amount of contribution made by baseline low power regulator K1, baseline high power regulator K2, and operability regulator K3.

Specifically, gains $A_1$, $A_2$, and $A_3$ are supplied to respective multiplication units 22, 24, and 26 (sometimes referred to herein as multipliers) which multiply the respective gains $A_1$, $A_2$, and $A_3$ by the respective regulator outputs. Outputs from multiplication units 22, 24, and 26 are supplied to separate summation units 28, 30 and 32 which combine the respective gain-adjusted outputs for each parameter. That is, the gain-adjusted values for fuel flow (WF36) from each multiplier 22, 24, and 26 are added together at summation unit 28. Similarly, the gain-adjusted values for nozzle area (A8) are added together at summation unit 30, and the gain-adjusted values for bypass area (A16) are added together at sununation unit 32. Summation unit outputs are supplied to engine 12 to control actuator positions.

In an exemplary embodiment, mode selector 20 transitions from the low power baseline mode to the high power baseline mode at throttle settings between 37.5 and 42.5. Selector 20 transitions between the baseline mode and the stall mode once the stall margin limit is exceeded. The values for the respective gains output by selector 20 are determined in accordance with the following rules:

$A1=(1.0-A_3)\max(0.0,\min(1.0,(42.5-PC)0.2))$, $A2=(1.0-A_3)(1.0-A_1)$, and $A3=\max(0.0,\min(1.0,2.0(1.0-SMR)))$.

Mode selector 20 utilizes fixed rules based on the engine parameters throttle setting (PC) and stall margin (SMR) to select a combination of individual modes for deriving values for fuel flow (WF36), nozzle area (A8), and bypass area (A16). These rules may vary from engine to engine and may, for example, be determined empirically.

In operation, engine operating parameters are supplied to regulators K1, K2, a and K3, gain schedulers 14, 16, and 18, and mode selector 20. Based on the sampled operating point value, each gain scheduler 14, 16, and 18 supplies a gain value to each respective regulator K1, K2, and K3, and each regulator K1, K2, and K3 applies the gain value to the regulator generated value. Mode selector 20 supplies gain values $A_1$, $A_2$, and $A_3$ to multiplication units 22, 24, and 26, which multiply the mode selector gain values to the respective outputs of each regulator K1, K2, and K3. The gain-adjusted values are then supplied to respective summation units 28, 30, and 32, and the summed actuator values are supplied to engine 12.

The above described control unit includes multivariable controllers rather than only single-input, single-output controllers. Such multivariable controllers enable robust control of the engine. In addition, the regulator outputs are actuator values rather than actuator rates, and model-computed parameters such as thrust (FN), engine temperature ratio (ETR), and stall margin (SM2) are used in addition to sensed parameters or simple ratios of sensed parameters. Also, a gradual transition between modes is possible by blending the outputs from each regulator, rather than selecting between controller outputs. Further, to function as the known control unit described above, one of gains $A_1$, $A_2$, and $A_3$ can be set to unity at any given time with the other gains set at zero.

Figure 2:
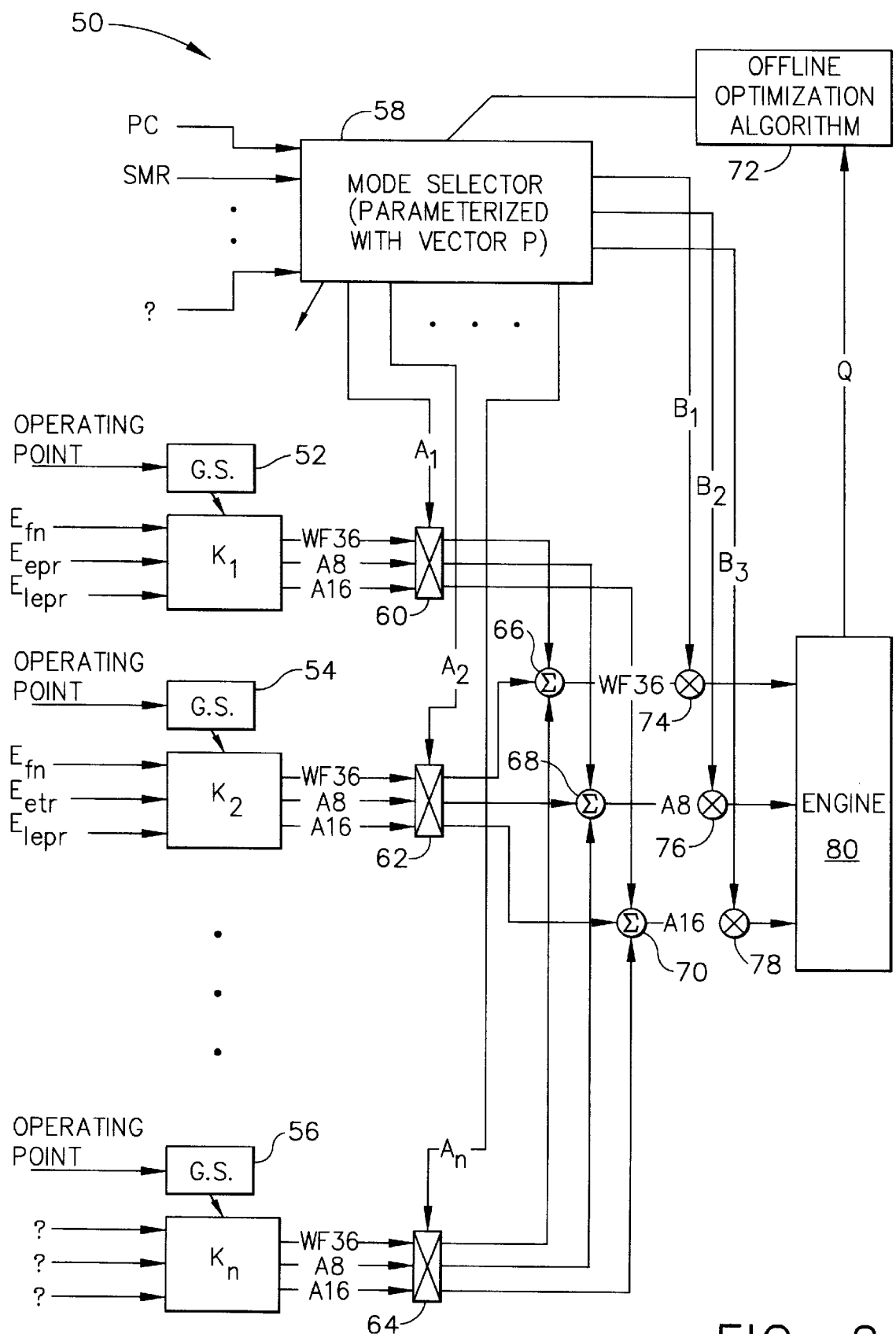
FIG. 2 is a block diagram of a control unit in accordance with another embodiment of the present invention.

FIG. 2 is a block diagram of a control unit 50 in accordance with another embodiment of the present invention. Control unit 50 includes gain-scheduled regulators $K_i$ (i=1,2, . . . ,n, where n is the number of distinct modes) having various sets of inputs $x_i$, and each regulator generates a set of outputs. In the exemplary embodiment shown in FIG. 2, the regulator inputs are the same as the regulator inputs in the embodiment shown in FIG. 1. Gain schedulers 52, 54, and 56 are coupled to each regulator $K_i$, and based on the operating point, provide a computed set of gains to each respective regulator $K_i$, to be applied to the regulator generated outputs.

Control unit 50 also includes a mode selector 58 which includes rules that perform the functions of blending the regulator outputs and tuning the blended outputs for improved performance. In one embodiment, mode selector 58 receives, as input, at least one of a sensed value, a model-computed value, an error in a value relative to demand, and a rate of change of the values and errors. Further, blending gain values $A_i$ and tuning gain values $B_j$ are determined using at least one of a rule-based, a fuzzy, and a neural-net scheme. Parameters of the rule-based, fuzzy, and neural-net scheme are selected using a complex performance index. The performance index is a weighted sum of an extent of a limit violation, a command following error, and a high-level objective.

Blending rules produce scalars $A_i \in [0,1]$, by which all three outputs for each mode $K_i$ are multiplied by multipliers 60, 62, and 64. The scaled outputs of all n modes are summed by summers 66, 68, and 70 to yield blended actuator values for fuel flow (WF36), nozzle area (A8), and bypass area (A16).

In addition, and to improve on the results of simply using mode blending logic, tuning is utilized to direct proportional plus derivative error feedback to adjust the commanded actuator values. Tuning provides an improved response to a desired variable, e.g., faster rise time or smaller error in transient regions, than obtained by mode blending alone.

Generally, feedback gains $B_i$ used for tuning are derived from additional "rules" in mode selector 58, and these tuning rules are optimized together with the mode selection rules. Gains $B_i$ are multiplied with the summed values by multipliers 74, 76, and 78, and the blended and tuned actuator values are supplied to engine 80. Thus, mode selector 58 selects an appropriate blend of controller outputs and also tunes the blend for better performance. Mode selector 58 also is adjustable using an off-line optimization algorithm 72.

More specifically, blending is defined as:

$$y^B = \sum_{i=1}^{n} A_i y_i.$$

Thus, $y^B$ is a weighted sum of the outputs of the individual modes. Tuning rules are used to adjust the individual components of:

$$\{y^T\}_i = B_i \{y^B\}_i,$$

i=1,2,3; $B_i \in [1-c, 1+c]$, where c is the maximum amount of tuning permitted. Mode selection is the function of blending and tuning the regulator outputs to produce the engine inputs, denoted by $y^T$.

Mode selector 58 has the same inputs as mode selector 20 of control unit 10 (FIG. 1), with additional inputs (and rules) for the additional blended modes as well as the tuning adjustments $B_i$. In an exemplary embodiment, mode selector 58 is rule-based, and includes blending and tuning rules which have a saturated linear relationship smoothed through the use of hyperbolic tangent.

Rules are typically of the form:

A=½(tan h(w(x−c))+1)

where x is either a commanded or sensed variable such as throttle setting, and the parameters c and w determine the center and slope (or width) of the sigmoid shape, respectively.

Two parameter sets also are utilized. The first parameter set distinguishes between blending and tuning rules. The second parameter set, specific to each rule, determines the unique functional relationship (variables and shape) of that rule. The parameters of the second set are "optimally" chosen for improved engine performance by an off-line adaptation algorithm 72 which minimizes a quadratic cost function with time-varying weights.

In an exemplary embodiment, rule parameters are selected by taking the system through a representative command trajectory using the initial parameters for the mode selection rules. A performance index Q is a measure of the quality of the system performance. The index Q is always a positive number, and smaller values of Q indicate better engine performance than larger values of Q, i.e., a reduction of Q shows improved performance.

The performance index Q is evaluated at each time step and summed over the entire trial. A search algorithm is executed for a given number of trials or until the performance reaches some predefined level.

Optimization algorithm 72 utilizes the complex performance index in order to train mode selector 58. The performance index, in one embodiment, includes terms to express three goals: limiting, command following, and gain minimization. The highest priority is on the parameters being limited, as these are critical to engine operation. For example, parameters such as engine temperature, various stall margins, and maximum fan speeds are limited. The next priority is command following, e.g., making the actual thrust track the desired thrust. Finally, minimization applies to quantities such as specific fuel consumption and the quantities $|B_i - 1|$. That is, the tuning adjustments to the blended control values should not be significant since large tuning values indicate an inefficient blend of modes.

To implement mode selector 58, two tasks are performed. Specifically, rules are generated and, once a set of rules has been generated, the rules are calibrated. Rule generation is the process of determining components that affect gains $A_i$. For example, the contribution of one mode might be altered depending on the value of engine power level, with an additional factor based on the fan stall margin. In an exemplary embodiment, the shapes of the individual rules are linear with "smooth" limits. The parameters, that is, the actual values used for the centers and slopes, are changed and refined by calibration.

In an exemplary embodiment, the blending rules are of the form:

$$A_i = \frac{1}{2}\left(\tanh\left(\sum_{j=1}^{n_i} W_{ij}(x_{ij} - c_{ij})\right) + 1\right), i = 1, 2, 3,$$

and the tuning rules have the form:

$$B_m = 1 + k_m\left(\tanh\left(\sum_{j=1}^{n_m} W_{mj}(x_{mj} - c_{mj})\right)\right), m = 1, 2, 3.$$

However, rules may be implemented in the form of a fuzzy rule set, a neural network, or other heuristic algorithms. The maximum tuning magnitude (MTM, denoted by $k_m$) limits the maximum relative amount by which a tuned actuator value ($y^T_i$) may differ from the blended value ($y^B_i$) for that actuator. For example, setting MTM=5% limits the value of the $B_i$'s to the range [0.95, 1.05]. Two factors affecting the MTM are the minimum magnitude required to provide a significant performance improvement, and the maximum desired variation from the blended regulator output.

The rules can be considered as multidimensional planes passed through a hyperbolic tangent to provide "smooth" limits of 0 and 1 (for the blending rules) or $1-k_m$ and $1+k_m$ (for the tuning rules). The rules are nearly linear (within their limits) to changes in the parameters being measured. However, rules which work well at sea level/static do not necessarily work well at other flight conditions, and a set of TANH-limited linear rules may not be sufficient to cover the operating domain.

Therefore, in one embodiment, a rule equivalent to:

$$B_1 = 1 + k_m(\tan h(c_1 x_1 + c_2 x_2 + c_3 x_3 + c_4) + 1)$$

is implemented as:

$$B_1 = 1 + k_m(\tan h(c1x1 + c2x2 + c3x3 + c4x1x2 + c5x1x3 + c6x2x3 + c7) + 1)$$

The flexibility gained by the nonlinear terms needs to outweigh the penalty of the added parameters $c_5$, $c_6$, and $c_7$.

Further, mode selector 58 may be static or dynamic. A dynamic mode selector utilizes a parameter schedule that alters values of rule parameters based on a current operating point. Again, the performance benefits gained by parameter scheduling rules should be sufficient to justify the added complexity of the parameter schedule. A static mode selector has a fixed set of rules calibrated to perform well at a single operating condition. One form of the performance index used to calibrate the rules is of the form:

$$Q = q_{cf} + q_{1v}, \text{ where:}$$

$$q_{cf} = \sum_{i=0}^{T} \frac{10^{-6}(E_{FN})_i^2}{1 + 10^{-7}(E_{FN_{dem}})_i^2} + \frac{10^{-6}(\dot{E}_{FN})_i^2}{1 + 10^{-7}(\dot{E}_{FN_{dem}})_i^2} +$$

-continued $$\frac{10(E_{ETR})_i^2}{1 + 10(\dot{E}_{ETR})_i^2} + \frac{(\dot{E}_{ETR})_i^2}{1 + (\dot{E}_{ETR_{dem}})_i^2}$$

is a measure of the error in command following, and:

$$q_{iv} = \sum_{i=0}^{T} (2 - SM2R_1)^2 u_1(SM2R_i) + [1 + (E_{LEPR})_i]^2 u_2[(E_{LEPR})_i]$$

is a measure of the limit violation error, where:

$$u_{1(x)} = \begin{cases} 0 & x \geq 1 \\ 1 & x < 1 \end{cases}$$

$$u_{2(x)} = \begin{cases} 0 & x \leq 0 \\ 1 & x > 0 \end{cases}$$

are step functions, providing one-sided penalties, and T is the total simulation time. Q is a positive number, and it is desired to minimize Q. The actual form of the performance index can be determined empirically and the scaling of the various terms is chosen to yield desired performance characteristics.

Control unit 58 provides a gradual transition between modes by blending the outputs from each regulator rather than selecting between regulator outputs. In addition, actuator commands are further tuned to improved engine response while protecting engine limits, and an optimization of a performance index is utilized to combine the functions of command following and limit protection during off-line training to obtain rule weights.

Many variations and alternatives to the above described control units are possible. For example, many different combinations of single-input, single-output and multi-input, multi-output regulators can be used. Further, conventional sensor-based controllers and model-based regulators can be utilized. Also, and with respect to the rule structures, cross product $x_i*x_j$ and second order terms can be used, and the rule structure described above could be entirely replaced by a different form. Additional modes also can be added, and the blending rules can be more complex. Mode elimination can be attempted, for example, by simulating anew "mode" within the mode selector itself. Also, parameter scheduling techniques more elaborate than the linear methods described herein can be used. For instance, it is possible to use neural networks for the dynamic mode selector scheduling problem. In addition, other strategies could be developed to gather the parameter data initially, which leads into the calibration category. Other methods for generating the rules, such as using neural networks instead of fuzzy rule-based systems, can be used, and tuning of reference inputs to controllers, instead of tuning actuator commands, can be utilized.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. A control unit for a turbine engine, said control unit comprising:

a plurality of regulators configured to receive engine parameters as input and to generate output values for at least one actuator command;

a mode selector configured to generate a plurality of blending and tuning gain values;

a first set of multipliers for multiplying at least one of said blending gain values with each output value of each said regulator;

a plurality of summation units, each said summation unit coupled to each said multiplier to sum outputs from said multipliers for a same actuator type; and a second set of multipliers for multiplying outputs from each said summation unit by at least one of said tuning valves.

2. A control unit in accordance with claim 1 wherein each said regulator comprises a gain scheduler configured to receive, as input, an operating point which corresponds to at least one of a power setting parameter and an inlet temperature or pressure.

3. A control unit in accordance with claim 1 wherein each said regulator generates an output value for at least one of fuel flow, nozzle area, bypass area, and stator position.

4. A control unit in accordance with claim 1 wherein each said regulator corresponds to a different mode of operation or operating condition, and receives, as input, at least one engine parameter.

5. A control unit in accordance with claim 4 wherein said engine parameter comprises at least one of an error in a sensed value for fan speed, an error in sensed value for combustor pressure, an error in sensed value for turbine temperature, an error in engine pressure ratio, a value determined from sensed values, and a model-computed parameter.

6. A control unit in accordance with claim 1 wherein said mode selector receives, as input, at least one of a sensed value, a model-computed value, an error in a value relative to demand, and a rate of change of said values and errors.

7. A control unit in accordance with claim 1 wherein said mode selector blending gain values $A_i$ have values in the interval [0.1], corresponding to an amount of contribution made by an i-th said regulator $K_i$.

8. A control unit in accordance with claim 7 wherein said mode selector tuning gain values $B_j$ have values in an interval [0.95, 1.05] corresponding to an amount of tuning to a j-th said actuator command $u_j$.

9. A control unit in accordance with claim 8 wherein said blending gain values $A_i$ are determined using at least one of a rule-based, a fuzzy, and a neural-net scheme, and said tuning gain values $B_j$ are determined using at least one of a rule-based, a fuzzy, and a neural-net scheme.

10. A control unit in accordance with claim 9 wherein parameters of said rule-based, fuzzy, or neural-net scheme are selected using a complex performance index.

11. A control unit in accordance with claim 10 wherein said performance index comprises a weighted sum of an extent of a limit violation, a command following error, and a high-level objective.

12. A control unit for a turbine engine, said control unit comprising:

a plurality of multiple input, multiple output regulators $K_i$, each said regulator $K_i$ configured to receive engine operating parameters as input and to generate output values for multiple actuators;

a plurality of a first set of multipliers for multiplying outputs from each said regulator $K_i$;

a mode selector configured to generate mode selection outputs $A_i$, said outputs $A_i$ having values corresponding to contributions to be made by each said regulator; and a plurality of a second set of multipliers for multiplying outputs from said mode selector.

13. A control unit in accordance with claim 12 further comprising a plurality of summation units, each said summation unit coupled to each said multiplier to sum outputs from said multipliers for a same actuator type.

14. A control unit in accordance with claim 13 wherein said mode selector is further configured to generate mode selection outputs $B_i$, said second set of multipliers for multiplying outputs from each said summation unit by respective outputs $B_i$.

15. A control unit in accordance with claim 12 further comprising a plurality of gain schedulers, each said gain scheduler coupled to one of said regulators and configured to provide a gain value to said regulator, each said gain scheduler configured to receive, as input, an operating point which corresponds to at least one of a power setting parameter and a fan inlet condition.

16. A control unit in accordance with claim 12 wherein each said regulator generates an output value for at least one of fuel flow, nozzle area, bypass area, and stator position.

17. A control unit in accordance with claim 12 wherein a first said regulator corresponds to a baseline low-power mode, a second said regulator corresponds to a baseline high-power mode, and a third said regulator corresponds to an operability mode.

18. A control unit in accordance with claim 12 wherein each said regulator receives, as input, at least one of values for errors in thrust ($E_{fn}$), liner engine pressure ratio ($E_{lepr}$), engine pressure ratio ($E_{eprs}$), engine temperature ratio ($E_{etr}$), and fan stall margin ($E_{sm2}$).

19. A control unit in accordance with claim 12 wherein said mode selector receives, as input, at least one of an engine control equivalent of throttle setting (PC) and stall margin (SMR).

20. A control unit in accordance with claim 12 wherein values for said respective output by said mode selector are determined in accordance with:

$$A1 = (1.0 - A_3) \max(0.0, \min(1.0, (42.5 - PC)0.2)),$$

$$A2 = (1.0 - A_3)(1.0 - A_1), \text{ and}$$

$$A3 = \max(0.0, \min(1.0, 2.0(1.0 - SMR))).$$

where PC is throttle setting and SMR is stall margin.

* * * * *